W. E. BENNETT.
APPARATUS FOR DISTILLING MERCURY FROM GOLD AMALGAM.
APPLICATION FILED APR. 12, 1909.

937,356.

Patented Oct. 19, 1909.

UNITED STATES PATENT OFFICE.

WILLIAM ERNEST BENNETT, OF LONDON, ENGLAND.

APPARATUS FOR DISTILLING MERCURY FROM GOLD AMALGAM.

937,356. Specification of Letters Patent. Patented Oct. 19, 1909.

Application filed April 12, 1909. Serial No. 489,425.

*To all whom it may concern:*

Be it known that I, WILLIAM ERNEST BENNETT, a citizen of the United Kingdom of Great Britain and Ireland, and resident of 56 Moorgate street, London, England, have invented certain new and useful Improvements in Apparatus for Distilling Mercury from Gold Amalgam, of which the following is a specification, such as will enable others skilled in the art to which it appertains to make and use the same.

This invention relates to an improved gold retort of the kind in which the mercury is separated from the gold amalgam by heat it being well known that when heat is applied to the amalgam the mercury is driven off and can be collected in water or by other means.

In constructing the apparatus according to this invention I provide a water pan of any convenient shape above which a tray or receiver is arranged to hold the amalgam, said tray being conveniently supported by a rod or equivalent arranged, removably or otherwise, in the water pan. A cover is placed over the tray and in bell-like or other convenient fashion dips into the water so as to render the space in which the tray is placed airtight. A fire basket of any suitable kind is arranged in juxtaposition to the upper part of the cover and may be supported thereby or by the water pan or in other convenient manner. The fire basket is preferably furnished with a hood to lead off the products of combustion.

The apparatus is preferably of circular cross sectional shape and the parts of such size in relation to each other, and of such construction, as to be capable of fitting or folding one within the other for transport purposes, for example, the fire basket may be slightly smaller than the water pan so as to drop therein when out of use, the inverted or bell-like cover may be sufficiently short to lay side uppermost in the fire basket, the tray and its support may be removed and placed within the cover and the hood may be conveniently made in two parts which may be placed one within the other and over the cover in the fire basket.

The positions of the fire baskets and the water pan when packed may of course be reversed and other modifications may be made without departing from the spirit of the invention.

Figure 1:
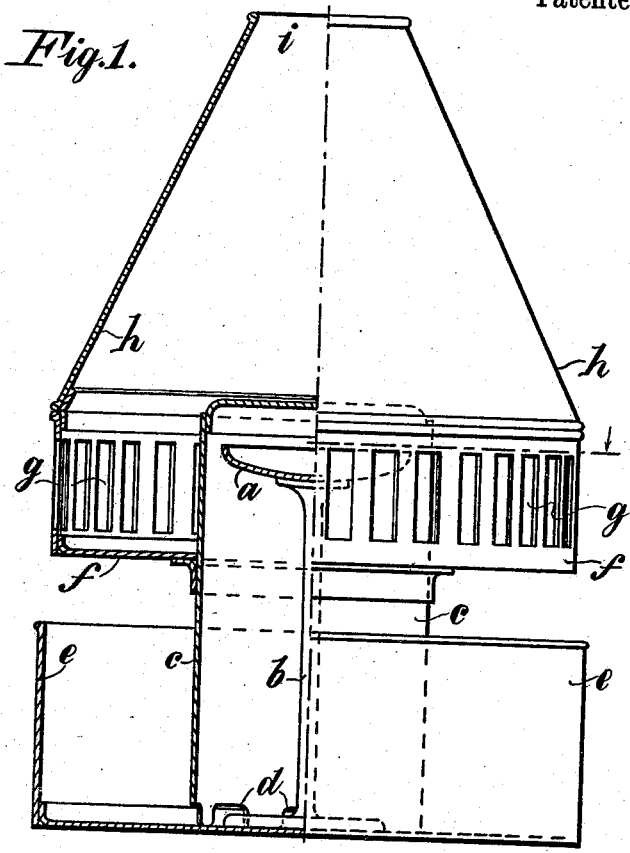
Figure 2:
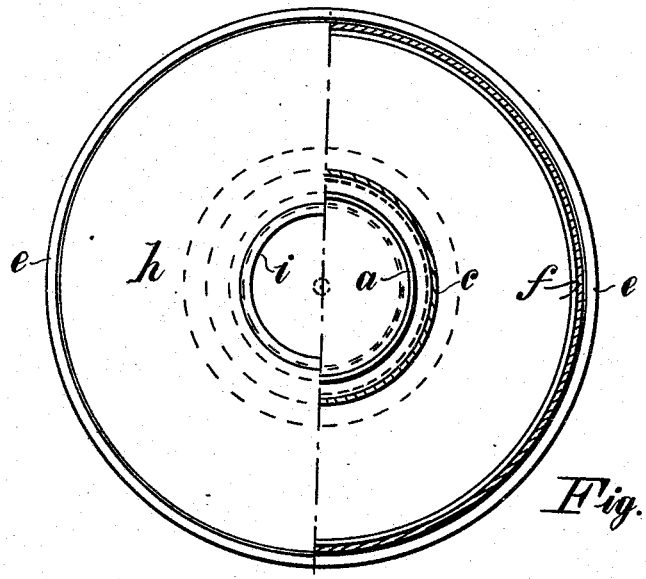

In the accompanying drawings:—Figure 1. illustrates a vertical partly sectional view of my invention as made in circular cross sectional form. Fig. 2. is a partly cross sectional plan view of an apparatus similar to that shown in Fig. 1.

The tray $a$ receives the amalgam and is supported by the rod $b$ shown standing centrally under the cover $c$ in the water trough $e$. The lower end of the cover $c$ has slots $d$ forming water passages into and out of the cover. A fire basket $f$ of annular shape and with openings $g$ is fitted around the upper end of the cover $c$ and supports the cone-shaped hood $h$ with outlet $i$.

The construction shown in the drawings is one of the most simple and suitable for the purpose but it is obvious that modifications such as arranging the tray away from the pan and furnishing it with a curved tube-like cover dipping into the pan could be made within the scope of the invention.

What I claim and desire to secure by Letters Patent is:—

1. For the extraction of mercury from gold amalgam by heat, a tray to hold the amalgam, a cover over the tray and dipping into a water pan and a fire basket in juxtaposition to the tray and supported by the cover.

2. For the extraction of mercury from gold amalgam by heat, a water trough, a cover dipping therein and closed except at some place below the water, a tray for the amalgam arranged within the cover and above the water in the trough and a fire basket arranged outside the cover and close to the tray and supported by the cover.

3. For the extraction of mercury from gold amalgam by heat, a water trough, a tray supported therein, a cover over the tray and dipping into water in the trough, a fire basket around the upper end of the cover and a hood over the basket for leading away the products of combustion, said basket and hood being carried by the cover.

4. For the extraction of mercury from gold amalgam by heat a water trough of circular cross section, a tray for the amalgam supported by a rod of less length than the inside diameter of the trough, a cover of cylinder-like form closed at one end and also of lesser length than the diameter of the trough, a circular fire basket, of such size in relation to the trough that the one will fit inside the other for transport purposes and a hood adapted to fit over the cover when the apparatus is in use.

In witness whereof I have hereunto set my hand in presence of two witnesses.

WILLIAM ERNEST BENNETT.

Witnesses:
 H. D. JAMESON,
 A. NUTTING.